Nov. 11, 1947.  J. H. SMITH  2,430,652
APPARATUS FOR THE PREVENTION OF LEAKAGE IN GAS GENERATORS
Filed Jan. 12, 1944
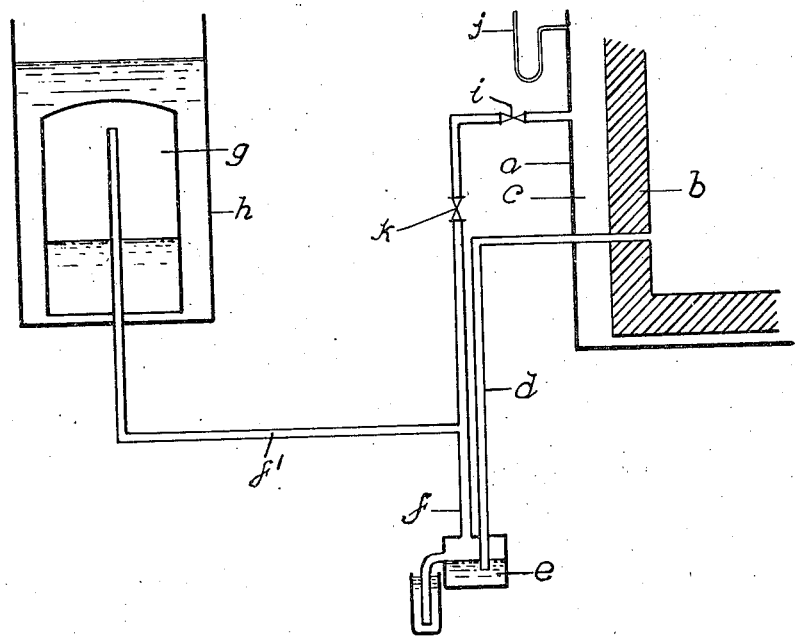
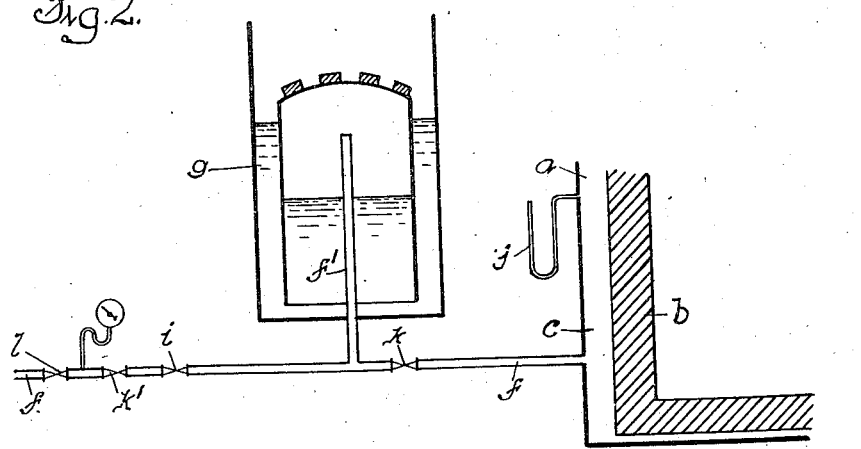
INVENTOR:
Joseph Habert Smith
By Dowell & Dowell
ATTORNEYS.

Patented Nov. 11, 1947

2,430,652

UNITED STATES PATENT OFFICE 2,430,652

APPARATUS FOR THE PREVENTION OF LEAKAGE IN GAS GENERATORS

Joseph Herbert Smith, Westminster, England, assignor to Humphreys & Glasgow Limited, Westminster, England Application January 12, 1944, Serial No. 518,011
In Great Britain January 4, 1943

2 Claims. (Cl. 23—281)

In the manufacture of hydrogen by the steam iron process in a generator comprising a chamber having a refractory lined metal shell gases in the chamber are liable to penetrate the refractory lining particularly when or where a relatively high pressure obtains within the chamber and to return to the chamber when or where the pressure therein is reduced, with the result that deleterious gases may contaminate the hydrogen which is often required to be of the highest possible purity. Similar conditions may occur in the production of other gases or vapourised liquids in generators having refactory lined shells.

According to the present invention the space between the exterior of the refractory chamber and the metal outer shell of a gas generator is subjected to gas or vapour pressure sufficient to prevent outward penetration of the chamber by gases from within the generator chamber. The gas or vapour under pressure should be such that if any passes through the walls of the chamber, it will not materially contaminate the gas being manufactured or can be removed from it in the purification treatment to which the gas is normally subjected.

In the case of hydrogen manufacture by the steam iron process carbon monoxide or nitrogen present in the generator during the reduction phase may be prevented from penetrating the refractory walls of the chamber by maintaining during that phase carbon dioxide or hydrogen in the space between the chamber and the shell at a greater pressure than the gases within the generator. This may be effected in various ways. For instance, during the oxidation phase, if the pressure in the generator is higher than during the reduction phase, hydrogen may be bled from the generator through a water seal or wash box acting as a non-return valve and cooler into a holder in communication, it may be through a regulating valve, with the space between the outer shell and the chamber, the holder being adapted to maintain the hydrogen under pressure for supply to the said space as may be required. Or the holder may be supplied with gas, for instance carbon dioxide, from a cylinder through a reducing valve and a regulating valve to prevent overfilling; any small amount of carbon dioxide passing from the space between the shell and the refractory chamber walls into the hydrogen being produced would be removed in the purifying process. Or impure hydrogen resulting from purging may be collected and compressed into a small weighted holder whence it is supplied to the space between the shell and the lining as required. The space between the outer shell and the chamber may be supplied with steam under suitable pressure but it would then be necessary to lag the shell to reduce condenastion and loss of pressure.

Valves may be provided to control the admission of gas or vapour to the space between the shell and the chamber walls to required periods of the cycle of operation and such valves may be coupled with the working valves of the plant.

In the accompanying drawings, Figs. 1 and 2 are sectional views illustrating diagrammatically two ways of carrying out the invention in connection with a hydrogen generator.

$a$ represents the outer metal shell of a gas generator, $b$ its refractory walls and $c$ a space between the shell $a$ and the walls $b$; the space $c$ is shown of considerable radial depth for clearness of illustration.

In the arrangement illustrated in Fig. 1 a pipe $d$ leads from the interior of the generator walls $b$ to a washer $e$ acting as a non-return seal or valve and cooler; from the upper part of the washer $e$ a pipe $f$ leads to the space between the shell $a$ and the chamber $b$ and through a branch $f^1$ into a bell $g$ fixed in a water tank $h$; $i$ is a valve or cock for regulating the flow of gas to the space $c$ and $j$ a gauge for indicating the pressure in said space. A valve indicated at $k$ may may be provided if desired to enable admission of gas to the space $c$ to be restricted to certain periods of operation.

The pressure in the generator during the oxidation stage will cause hydrogen to flow through the pipe $d$, washer $e$ and pipe $f^1$ into the bell $g$, displacing water and increasing the head of water in the tank $h$ and, if the valve $k$ be open, into the space $c$ through the valve or cock $i$, the head of water in the tank maintaining hydrogen under pressure in the space $c$ and preventing outward penetration of the walls $b$ by gases from inside the generator chamber during other phases of the process of hydrogen manufacture.

In the arrangement illustrated in Fig. 2 a pipe $f$ is supplied with say carbon dioxide gas from a cylinder, not shown, and the pipe is connected to a weighted bell $g$ and to the space $c$ as shown. $l$ is a pressure reducing valve and $i$ the regulating valve or cock; two valves $k$ and $k^1$ may be provided in the pipe $f$ to control admission of the carbon dioxide to the space $c$.

The space $c$ as usual is packed with customary insulating materials such as slag wool or broken porous brick which have a high free space and offer little resistance to the flow of gases.

What I claim is:

1. In a gas generator, a refractory walled chamber; an outer shell surrounding the chamber and spaced therefrom; a bell-type gas holder; and a pressure regulating device comprising a liquid seal chamber having an exit at its upper end; a conduit leading from the space within the walled chamber and extending into the seal chamber to a point below the exit; and a second conduit extending from the exit both to the gas holder and to the space between the walled chamber and the shell, whereby a substantially constant pressure differential between the space within the walled chamber and the space between the walled chamber and shell may be maintained.

2. In a gas generator as set forth in claim 1, said generator being subject to cyclically varying pressures, a valve in the second conduit adjacent the shell, and relief means in the pressure regulating device, whereby the holder may be supplied with gas from the generator during a portion of the cycle when the valve is closed at a higher pressure than exists in the walled chamber during another portion of the cycle, said gas being adapted to be passed from the holder into the space between the outer shell and walled chamber when the valve is re-opened.

JOSEPH HERBERT SMITH.

REFERENCES CITED

The following references are of record in the file of this patent:

UNITED STATES PATENTS

| Number | Name | Date |
| --- | --- | --- |
| 1,090,874 | Pier | Mar. 24, 1914 |
| 1,159,865 | Pier | Nov. 9, 1915 |
| 1,969,422 | Pier | Aug. 7, 1934 |
| 2,080,102 | Willenborg | May 11, 1937 |
| 2,124,573 | Hayes | July 26, 1938 |
| 2,204,156 | Semon | June 11, 1940 |
| 2,212,835 | Keane et al. | Aug. 27, 1940 |